United States Patent Office 3,014,885
Patented Dec. 26, 1961

3,014,885
PRODUCTION OF HIGH DENSITY POLYETHYLENE COMPOSITION CONTAINING ORGANIC PEROXIDE CROSS-LINKING AGENT
Merrill E. Jordan, Walpole, and Frank R. Williams, North Quincy, Mass., assignors to Cabot Corporation, Boston, Mass., a corporation of Delaware
No Drawing. Filed July 17, 1957, Ser. No. 672,361
3 Claims. (Cl. 260—41)

This invention relates generally to plastic compositions, and has particular reference to polymers composed of essentially saturated long chain high molecular weight compounds of carbon and hydrogen, such as are produced by the polymerization of olefins. Typical of these are materials produced by ethylene polymerization at pressures of 1000 to 2000 p.s.i., having a specific gravity of between about .885 and .92, and molecular weight of about 10,000 to 40,000.

More recently, processes have been discovered by which ethylene and other olefins may be polymerized at much lower pressures, e.g., about 100 to 200 p.s.i., producing a polymer having a specific gravity of about .94 to .96 and a molecular weight in excess of 50,000. This new polymer is commonly known in the industry as "high density" polyethylene to distinguish it from the lower density material produced by the older high pressure process. Such high density polymers are considerably superior to the low density polymers in many physical properties, particularly in having greater strength, especially at elevated temperatures.

It has been found previously that the physical properties of the low density polymer can be improved by the addition thereto of substantial amounts of a suitable filler, such as carbon black, and a minor amount of a suitable free-radical producing agent, such as an organic peroxide, which decomposes on heating to effect cross-linking between adjacent polymer chains and filler. Such cross-linking greatly increases the yield strength, creep resistances, and stress cracking properties of the material.

It would seem probable that a similar increase in physical properties of the high density material could be obtained if it were compounded with a suitable filler and cross-linking agent, and this has indeed been found to be the case. A high density polymer of this type, when compounded with an equal amount of carbon black and cross-linked with a suitable amount of organic peroxide, has a yield strength 50% greater at 20° C. than the cross-linked, unfilled polymer, and a yield strength at 100° C. which is greater by a factor of at least 2.

Efforts to compound these high density materials with cross-linking agents for commercial use in plastics fabricating machinery such as extruders and injection molding machines have heretofore been unsuccessful. The problem has been that the required mixing temperatures were so high that the cross-linking agent decomposed during mixing. Yet the cross-linking agent must be thoroughly milled into the polymer. Accordingly such milling must be accomplished in such a manner that no substantial amount of cross linking takes place during the milling process, since once cross linking occurs, the material is thereafter substantially unworkable.

To accomplish milling and compounding of the polymer, it must first be fluxed, that is, transformed into a semi-molten state, usually on heated rolls, and maintained in this state while the other components of this compound are added. Milling must then be continued until a uniform mixture is obtained. In the case of the high density polymer, the fluxing must be accomplished at a temperature of at least 275° F. which is high enough to decompose the preferred cross-linking agents at a rate sufficient to effect cross-linking of the polymer. Hence, when conventional milling of a high density polymer with such agent is attempted, cross-linking commences as soon as the peroxide is added to the material on the mill, rendering the material useless for further processing. Although test data obtained on the thus cross-linked material proves it to have physical properties far superior to the uncross-linked polymers of this type, it has heretofore been impossible to produce the compound in the uncross-linked form suitable for subsequent fabrication.

The object of this invention is to provide a novel, heat cross-linkable compound of a high density polymer and a chemical cross-linking agent which decomposes at conventional milling temperatures.

Another object of the invention is to provide a method of milling such a cross-linking agent into a high density polymer in which no substantial cross linking of the compound occurs.

These and other objects of the invention will be apparent to one skilled in the art from the following description of a specific embodiment thereof.

In accordance with this invention, it has been found that the above described type of high density polymer may be milled with an organic peroxide cross-linking agent at a considerably lower temperature than heretofore possible by incorporating therein a fluxing agent having a melting point less than that of the high density polymer. The fluxing agent employed in the practice of this invention is a relatively low density polymer which is itself susceptible to cross linking. In the preferred embodiment of the invention, a blend of high density polymer with from 10% to about 50% of low density polymer has been found to be millable at temperatures below which any substantial decomposition of the cross-linking agent occurs. Such blends containing 60 to 90% by weight of high density polyethylene are of special interest as shown by original claims 4 and 6 of this application as filed.

The preparation of such materials may be accomplished in a number of ways. In one method, the low density material may be fluxed in heated rolls at a temperature not in excess of 240° F., and the high density material gradually added. Although the high density material, by itself, would not flux readily, if at all, at this temperature the presence of the previously fluxed low density material on the rolls readily accomplishes the fluxing of the high density material. The reason for this effect is not entirely clear. However, it is suspected that it is due to the excellent heat transfer resulting from the presence of the fluxed material and possibly also to a lowering of the melting point as the high density material gradually dissolves in the fluxed low density material. In any event, the highly density material is readily fluxed in this manner at a temperature below that at which it would flux by itself and at a temperature at which the organic peroxide may be added without substantial decomposition.

After the polymer blend is completely fluxed, filler material may be added and milling continued until it is completely dispersed. Thereafter the organic peroxide may be added, and milling continued to disperse the peroxide. The material is then removed from the rolls and cooled rapidly. It may then be chopped or cut into pellets for feeding to plastic fabricating machinery or for other use.

*Example I*

On a two roll mill heated to 240° F., 250 grams of low density polyethylene (specific gravity .92) were fluxed into a viscous state. Two hundred fifty grams of high density polyethylene (specific gravity .95) were then added while milling continued. The high density material was completely dispersed and fluxed within three minutes. Five hundred grams of medium thermal carbon black (Sterling MT) were added and milling continued until it was completely dispersed in the polymer blend. 8.75 grams of dicumyl peroxide were then added to the material on the mill, and milling continued for about one minute. The material was then sheeted off the roll and immediately cooled. It was then molded into sheets about 1/16" in thickness by heating in a press at 350° F. for ten minutes to effect the cross-linking by the decomposition of the peroxide.

The resulting sheet was tough, flexible, and strong. Its yield strength as measured by standard ASTM testing procedure, was 2900 p.s.i. at 20° C. and 1230 p.s.i. at 100° C.

*Example II*

A procedure similar to that of Example I was followed, with the proportion of low density material being 30% of the total polymer. The amount of carbon black and dicumyl peroxide was maintained in the same proportion to the total polymer as before. The high density material fluxed readily into the previously fluxed low density material at a temperature of 240° F. A test sheet of the material, after curing at a temperature of 350° F. for 10 minutes had a yield strength at room temperature of 3300 p.s.i. and a yield strength at 100° C. of 1350 p.s.i.

*Example III*

A procedure similar to that of Example I was followed, with the sole exception that the amount of low density material was decreased to 10% of the total polymer, with the amount of carbon black being reduced to 80% by weight of the polymer, and the dicumyl peroxide being maintained in the same ratio to the total polymer as before. The high density material took only slightly longer to flux into the previously fluxed low density material than in the previous examples, with the temperature of the batch at 240° F. A test sheet of this material, after curing of 10 minutes at 350° F., had a yield strength at room temperature of 4300 p.s.i. and a yield strength at 100° F. of 2150 p.s.i.

Although a major advantage of the polymer blends as described above is the fact that the cross-linking agent may be incorporated therein without cross linking occuring during the milling process, an equally important aspect of the invention is the fact that the material so milled may thereafter be fed into an injection molding machine or an extruder at a temperature necessary for processing into a desired article without cross linking occuring in the fabricating machinery. The formed article may thereafter by subjected to a heat treatment by any convenient means to effect the cross linking.

Although in the above examples carbon black was used as the filler and is preferred for strength and weather resistance, other fillers may be used if a color other than black is desired in the final product. For example, fillers such as silica, clay, calcium carbonate, and various minerals may be used, however, at some sacrifice of yield strength.

Many cross-linking agents are known and have been used previously with the low density type of polymers, and such agents are generally satisfactory for use in the present invention. However, it is preferred to use the above mentioned dicumyl peroxide because of its relatively high decomposition temperature and commercial availability. Examples of other suitable agents are di($\alpha$-aryl substituted alkyl) peroxides such as di($\alpha$-phenyl ethyl) peroxide and $\alpha$-cumyl-p teritary butylcumyl peroxide. Other cross-linking agents which have been suggested for this purpose are organic sulfides such as dicumyl disulfide, and aliphatic azo compounds such as azo isobutyrnitrile.

Since certain other obvious changes may be made in the invention without departing from the scope thereof, it is intended that all matter contained herein be interpreted in an illustrative and not a limiting sense.

We claim:

1. A process for producing a substantially completely uncrosslinked polymeric composition which is capable of being fabricated and extruded by conventional plastic working apparatus and strengthened by crosslinking on subsequent heat treatment, which comprises fluxing and milling low density polyethylene having a specific gravity between about 0.885 and 0.92 at a temperature below about 275° F. while adding thereto sufficient high density polyethylene having a density between about 0.94 and 0.96 to provide a mixture comprising from about 60% to about 90% high density polyethylene, and milling into said mixture while fluxing at a temperature below about 275° F. and organic peroxide crosslinking agent which cannot be exposed to temperatures above 275° F. in the presence of polyethylene without effecting crosslinking thereof.

2. A process for producing an article of polymeric composition which comprises fluxing and milling low density polyethylene having a specific gravity between about 0.885 and 0.92 at a temperature below about 275° F. while adding thereto sufficient high density polyethylene having a density between about 0.94 and 0.96 to provide a mixture comprising from about 60% to about 90% high density polyethylene, milling into said mixture while fluxing at a temperature below about 275° F. an organic peroxide crosslinking agent which cannot be exposed to temperatures above about 275° F., in the presence of polyethylene without effecting crosslinking thereof, continuing the milling until a homogeneous mixture is obtained, forming the resulting mixture into a desired shape, and curing the shaped mixture at a temperature above about 275° F.

3. A process as set out in claim 1 which comprises the additional steps of milling a filler comprising carbon black into at least one of the thermoplastic components prior to the addition of said organic peroxide crosslinking agent, said filler being added in an amount of between about 50% and 100% by weight of the total thermoplastic component.

References Cited in the file of this patent

UNITED STATES PATENTS

| 2,512,459 | Hamilton | June 20, 1950 |
| 2,725,374 | Mosher | Nov. 29, 1955 |
| 2,788,340 | Dannels | Apr. 9, 1957 |
| 2,791,576 | Field | May 7, 1957 |
| 2,888,424 | Precopio et al. | May 26, 1959 |

FOREIGN PATENTS

| 591,058 | Great Britain | Aug. 6, 1947 |
| 597,833 | Great Britain | Feb. 4, 1948 |
| 619,905 | Great Britain | Mar. 16, 1949 |
| 201,195 | Australia | Feb. 22, 1956 |